US012195305B2

(12) United States Patent
Vehmeijer et al.

(10) Patent No.: US 12,195,305 B2
(45) Date of Patent: Jan. 14, 2025

(54) VESSEL AND METHOD FOR INSTALLATION OF A PILE ADAPTED TO SUPPORT AN OFFSHORE WIND TURBINE

(71) Applicant: ITREC B.V., Schiedam (NL)

(72) Inventors: Terence Willem August Vehmeijer, Schiedam (NL); Matthijs Michiel Stofregen, Schiedam (NL)

(73) Assignee: ITREC B.V., Schiedam (NL)

( * ) Notice: Subject to any disclaimer, the term of this patent is extended or adjusted under 35 U.S.C. 154(b) by 274 days.

(21) Appl. No.: 17/603,738

(22) PCT Filed: Apr. 15, 2020

(86) PCT No.: PCT/EP2020/060567

§ 371 (c)(1),
(2) Date: Oct. 14, 2021

(87) PCT Pub. No.: WO2020/212409

PCT Pub. Date: Oct. 22, 2020

(65) Prior Publication Data

US 2022/0177081 A1 Jun. 9, 2022

(30) Foreign Application Priority Data

Apr. 15, 2019 (NL) ...................................... 2022947

(51) Int. Cl.
*B63B 27/10* (2006.01)
*B63B 21/16* (2006.01)
(Continued)

(52) U.S. Cl.
CPC .............. *B66C 13/06* (2013.01); *B63B 21/16* (2013.01); *B63B 27/10* (2013.01); *B63B 35/003* (2013.01);
(Continued)

(58) Field of Classification Search
CPC ....... B66C 23/185; B66C 13/08; B66C 1/108; B66C 13/06; B66C 23/52; B66C 23/53;
(Continued)

(56) References Cited

U.S. PATENT DOCUMENTS 6,644,486 B2 * 11/2003 Jacoff ..................... B66C 13/06 414/733
7,367,464 B1 * 5/2008 Agostini ............... B66C 13/063 212/308
(Continued)

FOREIGN PATENT DOCUMENTS

CN 105829203 A * 8/2016 ........... B63B 35/003
CN 106865415 A * 6/2017 ............ B66C 13/04
(Continued)

OTHER PUBLICATIONS

Dutch Search Report, issued in Priority Application No. 2022947, dated Dec. 16, 2019.
(Continued)

*Primary Examiner* — Gregory W Adams
(74) *Attorney, Agent, or Firm* — Birch, Stewart, Kolasch & Birch, LLP

(57) ABSTRACT

A vessel and a method for installation of a pile adapted to support an offshore wind turbine are described. The method includes a) suspending the pile from a hoisting cable in a substantially vertical orientation; b) providing a lower end of the pile in a pile holding system limiting horizontal motion of a pile portion held by the pile holding system; and c) lowering the pile with the pile being held by the pile holding system. The lowering includes at least lowering the pile through a splash zone of a body of water, and during step c), two tugger lines are directly or indirectly connected to the pile at a location between the pile holding system and the
(Continued)

Figure 1:
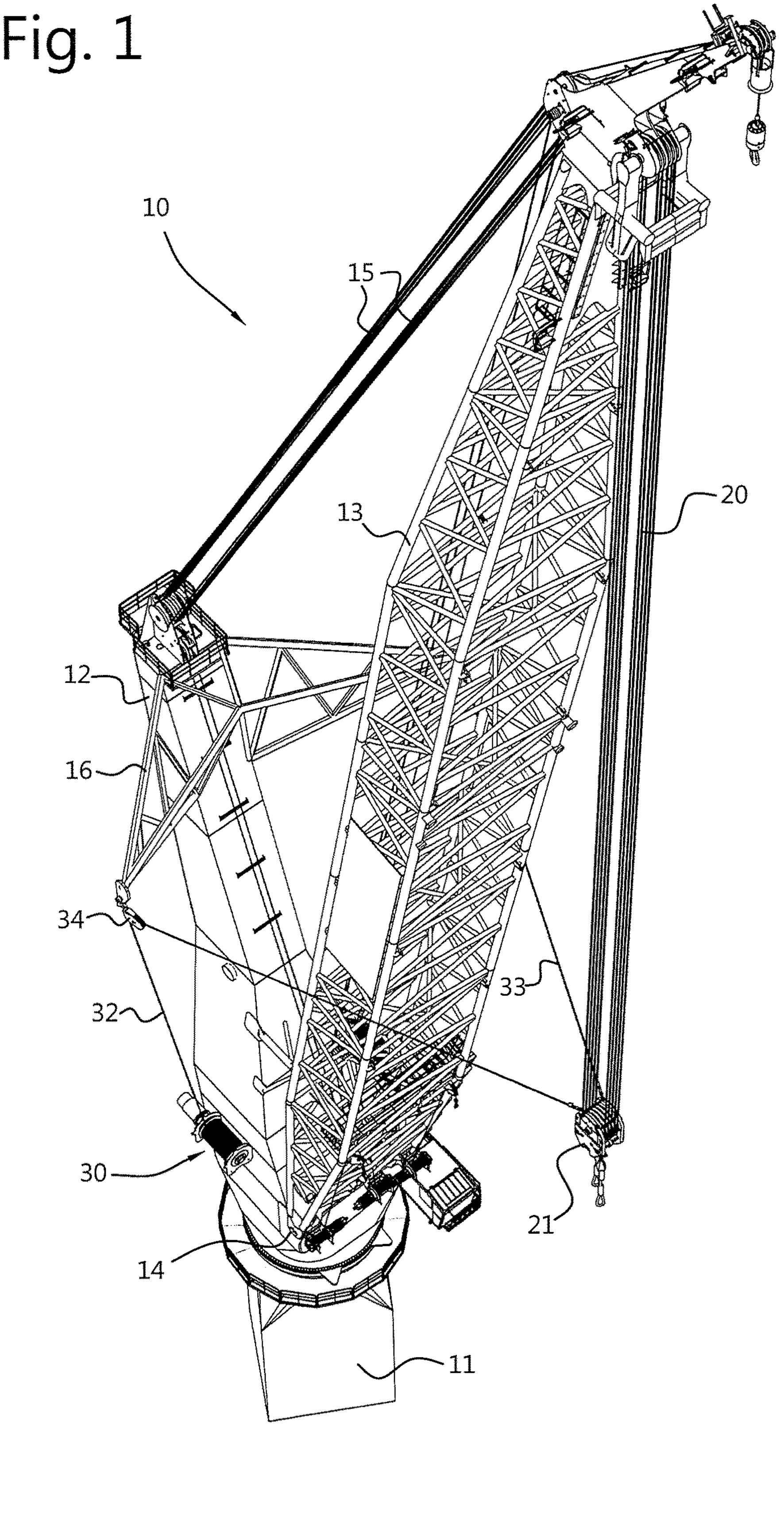

hoisting cable, said tugger lines being operated to damp motion of the pile in two respective horizontal directions.

13 Claims, 5 Drawing Sheets

(51) Int. Cl.

| | |
|---|---|
| ***B63B 35/00*** | (2020.01) |
| ***B66C 13/06*** | (2006.01) |
| ***E02D 13/04*** | (2006.01) |
| *B63B 35/44* | (2006.01) |
| *B66C 23/52* | (2006.01) |
| *E02B 17/00* | (2006.01) |
| *E02B 17/02* | (2006.01) |
| *E02D 7/00* | (2006.01) |

(52) U.S. Cl.
CPC ........ *E02D 13/04* (2013.01); *B63B 2035/446* (2013.01); *B66C 23/52* (2013.01); *E02B 2017/0039* (2013.01); *E02B 2017/0091* (2013.01); *E02B 17/02* (2013.01); *E02D 7/00* (2013.01)

(58) Field of Classification Search
CPC ....... B63B 35/003; B63B 35/44; B63B 27/10; B63B 21/16; B63B 2035/446; E02D 27/525; E02D 7/00; E02D 27/425; E02D 13/04; E02B 17/021; E02B 17/02; E02B 2017/0082; E02B 2017/006; E02B 2017/0091; E02B 2017/0039
See application file for complete search history.

(56) References Cited

U.S. PATENT DOCUMENTS

| | | | | |
|---|---|---|---|---|
| 8,740,543 | B2 * | 6/2014 | Weaver | F03D 7/0224 415/908 |
| 8,794,457 | B2 * | 8/2014 | Richter | B66C 1/108 212/274 |
| 8,911,178 | B2 * | 12/2014 | Vanderbeke | E02D 27/42 405/209 |
| 9,238,569 | B2 * | 1/2016 | Sørensen | B66D 1/50 |
| 9,555,864 | B2 * | 1/2017 | Meskers | B63B 39/02 |
| 2010/0047040 | A1 * | 2/2010 | Burgess | B63B 27/19 414/137.7 |
| 2011/0129301 | A1 * | 6/2011 | Wang | B63B 21/27 405/204 |
| 2015/0110582 | A1 | 4/2015 | Jacobsen et al. | |
| 2016/0002010 | A1 | 1/2016 | May | |
| 2017/0370068 | A1 * | 12/2017 | Mulderij | E02D 27/42 |

FOREIGN PATENT DOCUMENTS

| | | | | | |
|---|---|---|---|---|---|
| DE | 202009006507 | U1 * | 9/2009 | | B66C 23/52 |
| EP | 2 886 722 | A1 | 6/2015 | | |
| JP | 50-132893 | | 10/1975 | | |
| JP | 9-111764 | A | 4/1997 | | |
| JP | 2007032017 | A * | 2/2007 | | B66C 13/04 |
| JP | 2017101413 | A * | 6/2017 | | B66C 13/04 |
| NL | 2018377 | A * | 3/2017 | | B63B 35/003 |
| NL | 2016371 | B1 * | 9/2017 | | B63B 35/003 |
| WO | WO-2010138622 | A2 * | 12/2010 | | E02B 17/027 |
| WO | WO 2013/015684 | A1 | 1/2013 | | |
| WO | WO 2014/060741 | A2 | 4/2014 | | |
| WO | WO 2015/165463 | A1 | 11/2015 | | |
| WO | WO-2018117846 | A1 * | 6/2018 | | E02D 13/04 |

OTHER PUBLICATIONS

International Search Report, issued in PCT/EP2020/060567, dated Jul. 23, 2020.

Written Opinion of the International Searching Authority, issued in PCT/EP2020/060567, dated Jul. 23, 2020.

* cited by examiner

VESSEL AND METHOD FOR INSTALLATION OF A PILE ADAPTED TO SUPPORT AN OFFSHORE WIND TURBINE

The invention relates to a vessel and method for installation of a pile adapted to support a offshore wind turbine.

In a known method for installing an offshore wind turbine, the foundation, in the form of a pile, is installed first by driving the pile into the sea bottom after which the wind turbine is installed on the pile, either by installing the wind turbine at once as a whole or by assembling the wind turbine in parts on the pile.

There is a trend towards larger wind turbines and a desire to install offshore wind turbines at locations with larger water depths than currently encountered. Both result in larger and heavier foundations. Hence, it is expected that in the near future piles need to be installed that are larger than 100 meters, possibly 120 meters or larger. The weight of such piles may be larger than 1000 mt, possibly 1300 mt or above.

Installation of piles is currently done using jack-up type vessel in which legs are lowered into the water to lift the vessel at least partially out of the water so that waves have a limited or minimal effect on the vessel. An example thereof can be found in EP2886722A1.

Although the waves have a limited or minimal effect on the jack-up type vessel, the waves and also the wind may have a non-negligible effect on the pile itself during lowering resulting in swaying, i.e. pendulum-like movements, of the pile while being suspended from a crane via a hoisting cable. To damp these movement, EP2886722A1 teaches to use a gripping construction with gripping members being moveable relative to a support structure on the vessel, wherein movement-damping means are provided to damp movements of the gripping members relative to the support structure to damp swinging movements of the pile transversely of the longitudinal direction thereof.

A drawback of the teaching of EP2886722A1 is that the movement-damping means only result in damping of a rigid body eigenmode or zeroth eigenmode in which the pile is swinging like a pendulum. Higher eigenmodes are hardly damped by the movement-damping means, so that especially at more severe wave and wind conditions, which are able to excite these higher eigenmodes, the pile is undesirably moving hindering installation of said pile. With the expected increasing length of the future piles, this problem also increases.

Hence, it is an object of the invention to provide a vessel and method for installation of a pile adapted to support an offshore wind turbine, which vessel and method, respectively, allow installation of the pile at harsher wind and wave conditions.

According to a first aspect of the invention, there is provided a method for installation of a pile adapted to support an offshore wind turbine, said method comprising the following steps:

- a) suspending the pile from a hoisting cable in a substantially vertical orientation;
- b) providing a lower end of the pile in a pile holding system limiting horizontal motion of a pile portion held by the pile holding system; and
- c) lowering the pile with the pile being held by the pile holding system, wherein lowering includes at least lowering the pile through a splash zone of a body of water, wherein during step c), two tugger lines are directly or indirectly connected to the pile at a location between the pile holding system and the hoisting cable, said tugger lines being operated to damp motion of the pile in two respective horizontal directions.

An advantage of this method is that the horizontal position of the pile is controlled at two different height levels, so that more eigenmodes can be effectively damped when excited by waves and/or wind allowing installation to be carried out during harsher wind and wave conditions.

In case, a skilled person would contemplate to control the horizontal position of the pile at two different height levels, he would use two pile holding systems as known in the art and arrange them above each other instead of using the combination of a pile holding system and a tugger system, because EP2886722A1 teaches the use of one such pile holding system and US2015/0110582A1 teaches away from using tugger lines as they can only pull and not push against a load. However, the inventors found that using two tugger lines acting in different horizontal directions can also sufficiently damp pile motions.

In an embodiment, waves in the body of water, i.e. the sea, have a wave propagation direction seen in plan view. Further, one of the two tugger lines, i.e. a first tugger line, extends from the location between the pile holding system and the hoisting cable in a first tugger pull direction seen in plan view while the other one of the two tugger lines, i.e. a second tugger line, extends from the location between the pile holding system and the hoisting cable in a second tugger pull direction seen in plan view. The first and second tugger pull directions define an interior bisector dividing an angle between the first and second tugger pull directions into two equal parts. Preferably, the first and second tugger pull directions are positioned such that the wave propagation direction is in between a direction perpendicular to the bisector and a direction perpendicular to the first tugger pull direction or in between a direction perpendicular to the bisector and a direction perpendicular to the second tugger pull direction. An advantage thereof may be that during the entire period of a pile eigenmode, at least one of the two tugger lines is able to apply a pulling force to the pile which results in a more effective damping of the eigenmode.

In an embodiment, operation of the two tugger lines is controlled in dependency of control of the lowering of the pile as the two tugger lines also have to follow the lowering of the pile even in case no motion is to be damped.

In an embodiment, the at least two tugger lines are connected to a load connector or an attachment device prior to connecting the load connector or the attachment device to an upper end of the pile.

According to a second aspect of the invention, there is provided a vessel for installation of a pile adapted to support an offshore wind turbine, said vessel comprising:

- a crane with a hoisting cable and hoisting winch to suspend the pile in a substantially vertical orientation and to lower the pile;
- a pile holding system to hold the pile and limit horizontal motion of a pile portion held by the pile holding system;
- a tugger system including two tugger lines and corresponding tugger winches, said tugger lines being directly or indirectly connectable to the pile at a location between the pile holding system and the hoisting cable; and
- a control system for controlling the hoisting winch and the two tugger winches to lower the pile with the pile being held by the pile holding system using the hoisting winch and to damp motion of the pile in two respective horizontal directions using the two tugger winches.

In an embodiment, the tugger system is provided on the crane.

In an embodiment, the crane comprises a boom rotatably connected to a structure to rotate about a substantially horizontal rotation axis, wherein the structure comprises a spreader to guide the two tugger lines at opposite sides of the boom towards the location between the pile holding system and the hoisting cable.

In an embodiment, the location between the pile holding system and the hoisting cable is on an upper end of the pile.

In an embodiment, the location between the pile holding system and the hoisting cable is at a load connector suspended by the hoisting cable.

In an embodiment, the location between the pile holding system and the hoisting cable is at an attachment device between the load connector and the upper end of the pile.

In an embodiment, the two tugger lines include a first tugger line and a second tugger line, wherein the tugger system further comprises a first tugger winch for the first tugger line and a second tugger winch for the second tugger line, and wherein preferably the first and second tugger winches are arranged on the crane, e.g. on the structure or the boom of the crane.

In an embodiment, the tugger system includes a first tugger sheave to guide the first tugger line between the first tugger winch and the location, and a second sheave to guide the second tugger line between the second tugger winch and the location, wherein preferably the first and second sheave are arranged on the spreader.

In an embodiment, the tugger system is arranged on a deck of the vessel or another structure on the vessel other than the crane.

In an embodiment, the pile holding system is configured to pivot between an orientation corresponding to a substantially horizontal orientation of a pile held in the pile holding system and an orientation corresponding to a substantially vertical orientation of a pile held in the pile holding system, and wherein the tugger system is substantially aligned with the pile holding system and the pile held in the pile holding system in any orientation of the pile holding system and the pipe held in the pile holding system.

In an embodiment, the two tugger lines extend from the location between the pile holding system and the hoisting cable in a substantially horizontal direction. This can be obtained by using a sheave at an elevated position above an upper deck of the vessel to guide a tugger line towards the location between the pile holding system and the hoisting cable, but may also be obtained by arranging the entire tugger system at an elevated position above the upper deck of the vessel.

Figure 2:
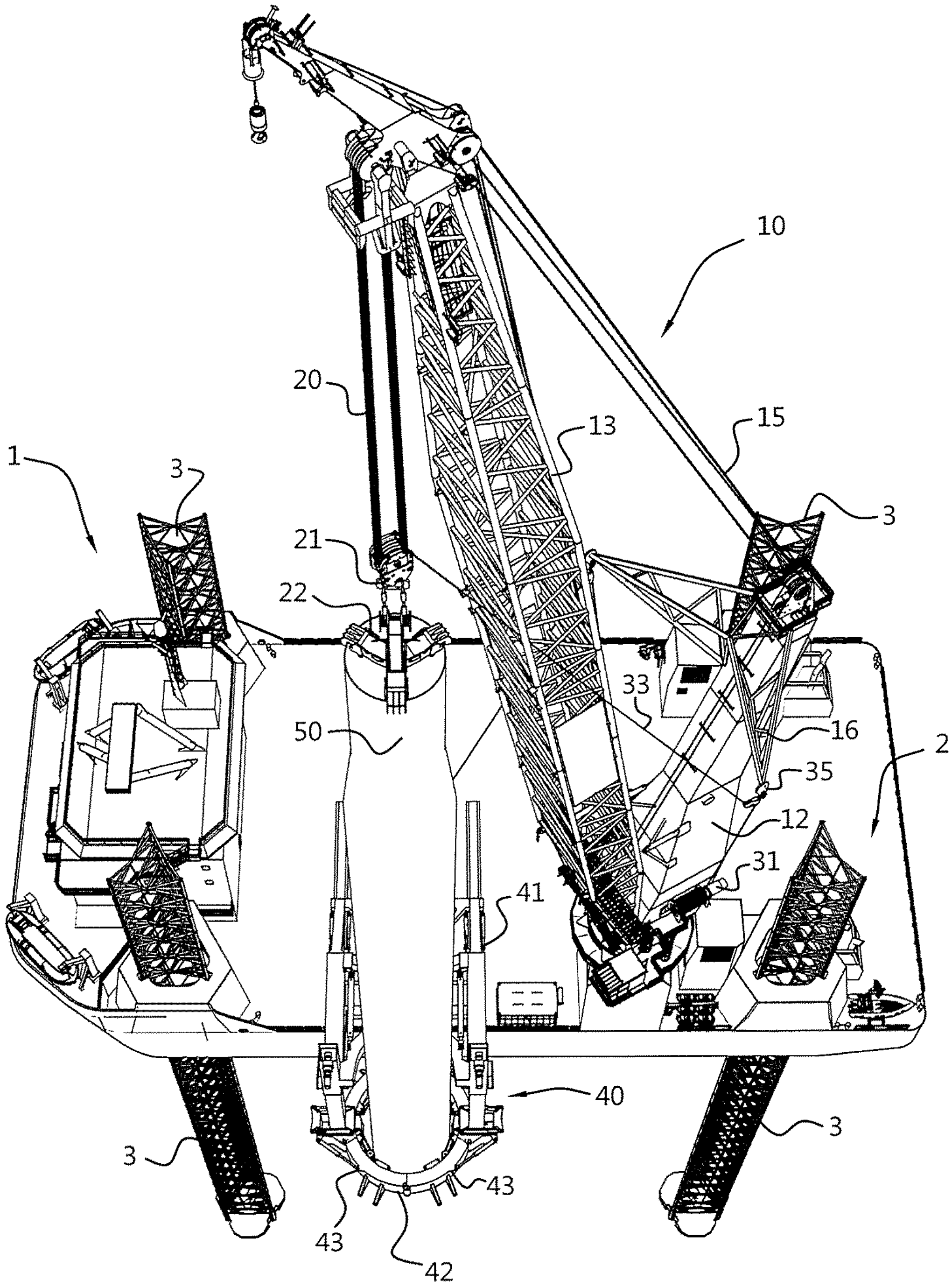
Figure 3:
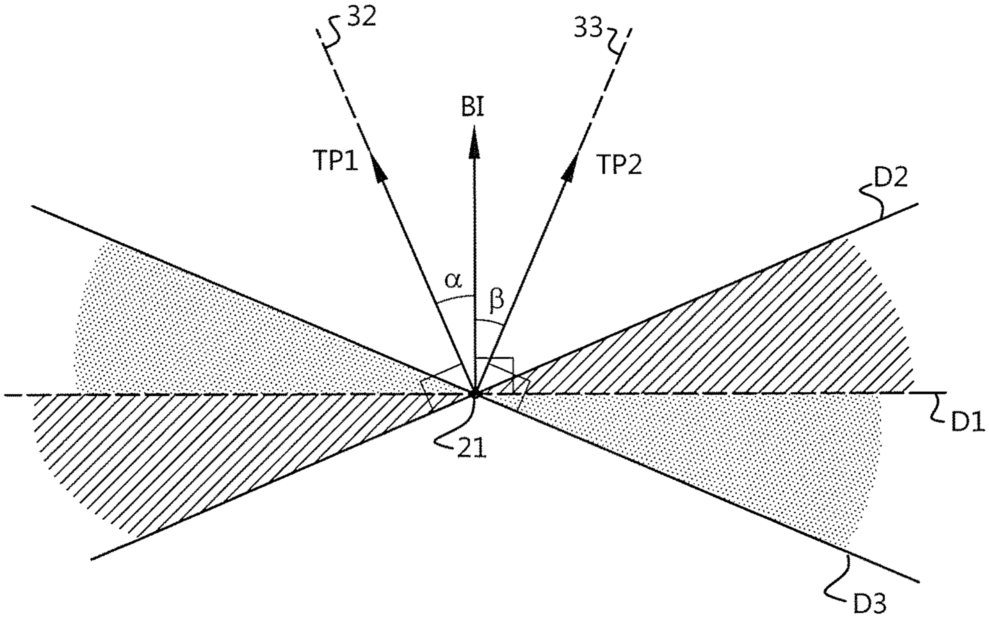
Figure 4:
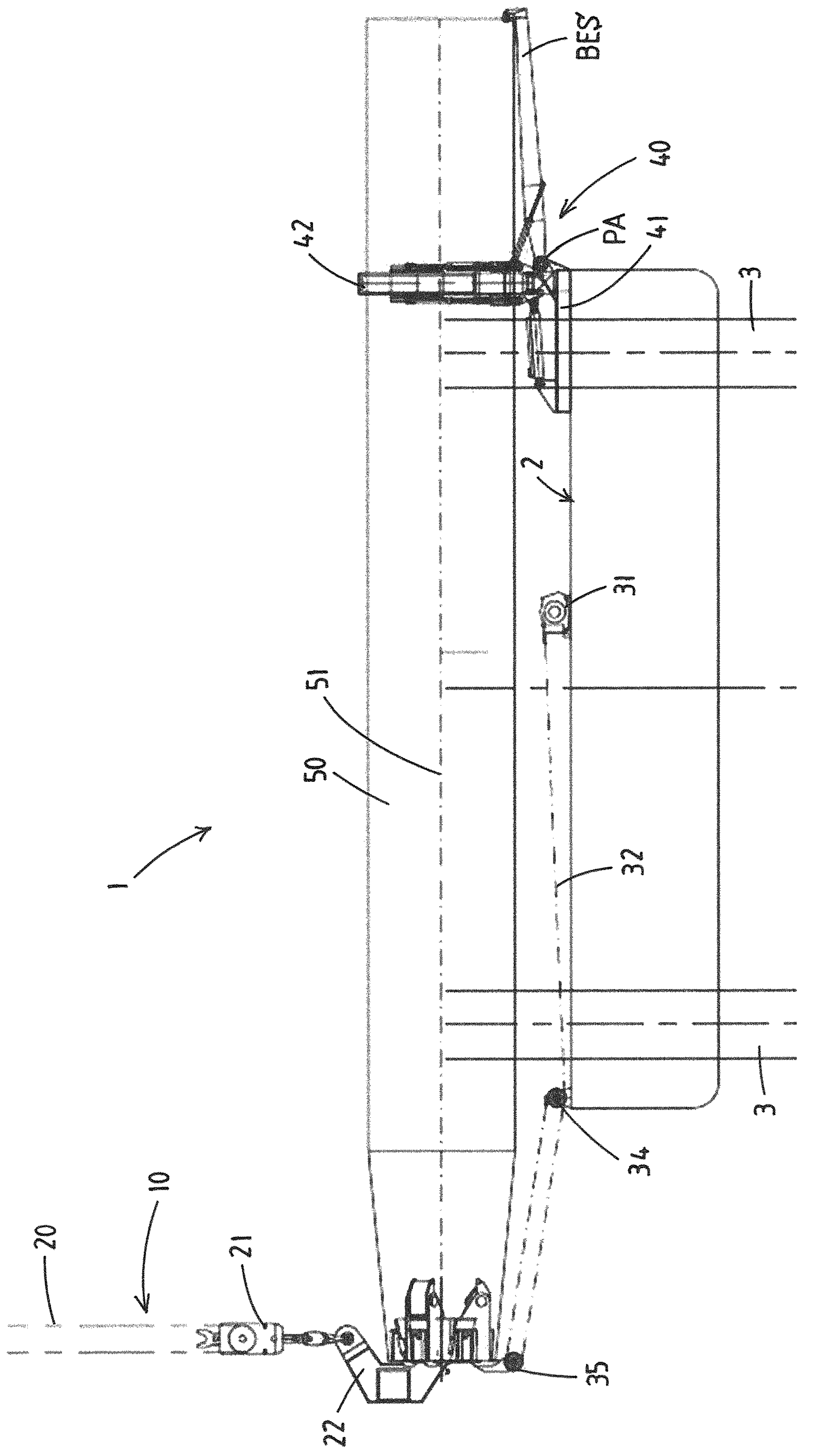
Figure 5:
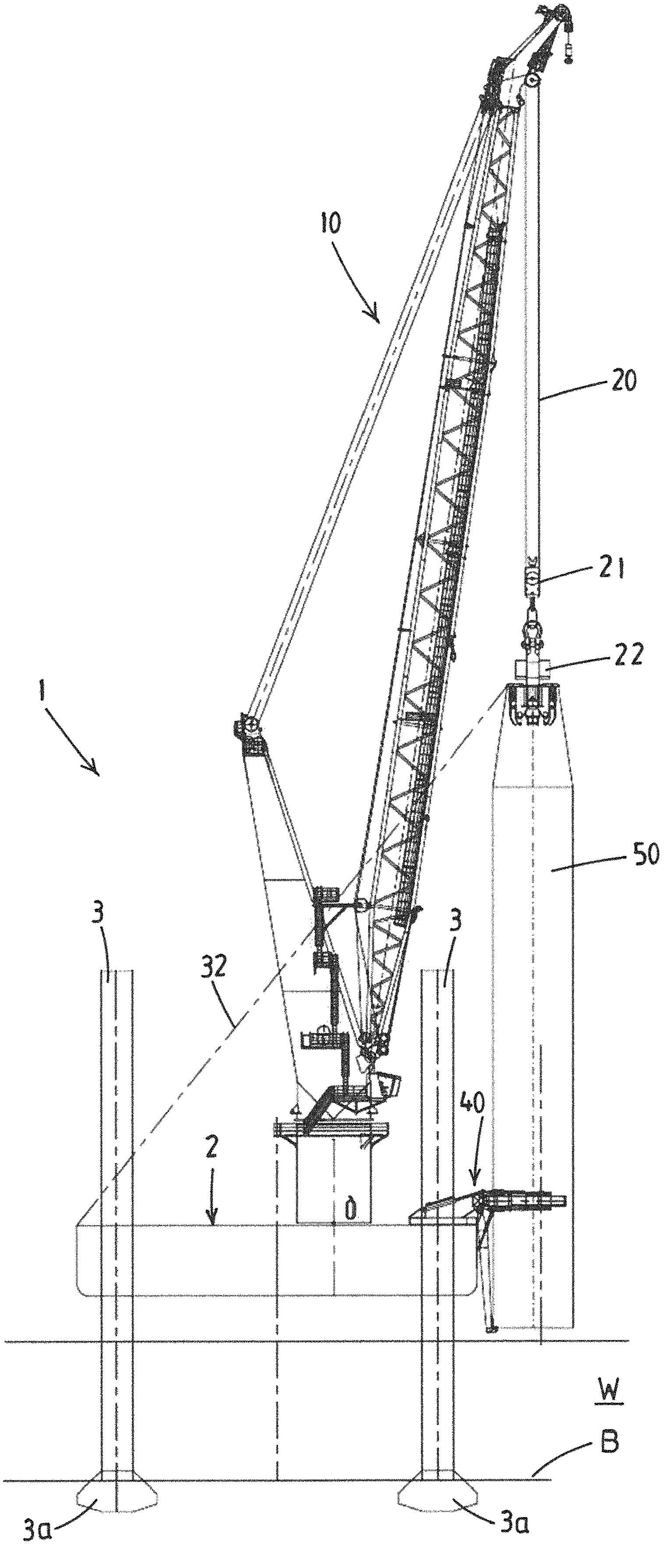

The invention will now be described in a non-limiting way by reference to the accompanying drawings in which like elements are indicated using like reference symbols, and in which:

FIG. 1 schematically depicts a crane to be used on a vessel and/or to be used in a method according to an embodiment of the invention;

FIG. 2 schematically depicts a vessel according to an embodiment of the invention including the crane of FIG. 1;

FIG. 3 schematically depicts a plan view of the load connector and the pulling directions of the tugger system of the crane of FIG. 1;

FIG. 4 schematically depicts a vessel according to another embodiment of the invention with a pile in a substantially horizontal orientation; and FIG. 5 schematically depicts the vessel of FIG. 4 with the pile in a substantially vertical orientation.

FIGS. 1 and 2 schematically depict a vessel 1 according to an embodiment of the invention and a crane 10 to be used on the vessel 1 and/or a method according to an embodiment of the invention. FIG. 1 schematically depicts the crane 10 in isolation from the vessel 1 and FIG. 2 schematically depicts the vessel 1 including the crane 10 while carrying out a method according to an embodiment of the invention.

The crane 10 as shown is a pedestal mounted crane, but it will be clear to the skilled person that the invention can also be used with other types of cranes, such as a mast crane. The crane 10 in this embodiment includes a pedestal 11, a structure 12 rotatable relative to the pedestal about a substantially vertical rotation axis, and a boom 13 rotatable relative to the structure 12 about a substantially horizontal rotation axis 14.

The crane 10 may further comprise a luffing cable 15 extending between an upper end of the structure 12 and an upper end of the boom 13, which luffing cable 15 is configured to be hauled in or paid out using a luffing winch (not shown) in order to set an angular orientation of the boom 13 relative to the structure 12. The luffing winch may be arranged inside the structure 12.

The crane 10 further comprises a hoisting system with a hoisting cable 20, a load connector 21 connected to the hoisting cable and a hoisting winch (not shown) operating on the hoisting cable to lower or lift the load connector 21. The hoisting winch may also be arranged inside the structure 12, wherein the hoisting cable 20 is preferably extending between the hoisting winch and the load connector via a location at or near the rotation axis 14 so that a luffing operation of the crane using the luffing cable 15 minimally effects a length of hoisting cable extending between an upper end of the boom 13 and the load connector 21.

In the embodiment of FIGS. 1 and 2, the crane 10 is also provided with a tugger system, which in this embodiment includes:

a first tugger winch 30;
a second tugger winch 31;
a first tugger line 32;
a second tugger line 33;
a first sheave 34; and
a second sheave 35.

The first tugger line 32 is configured to extend from the first tugger winch 30 via the first sheave 34 to the load connector 21 while the second tugger line 33 is configured to extend from the second tugger winch 31 via the second sheave 35 to the load connector 21.

To avoid interference between the first and second tugger lines 32, 33 and the boom 13, the structure 12 is provided with a spreader 16 with the first and second sheaves 34, 35 being fixed to the spreader 16 at a relatively large horizontal distance allowing the first and second tugger lines 32, 33 to pass the boom 13 and be connected to the load connector 21. A further advantage of the spreader 16 is that the first and second tugger lines 32, 33 extend in different directions from the load connector and thus are able to apply forces to the load connector 12 in different horizontal directions.

In FIG. 2, the crane 10 is arranged on the vessel 1, more in particular on an upper deck 2 of the vessel 1. The vessel 1 is a jack-up type vessel in which legs 3 can be lowered into the water to lift the vessel 1 at least partially out of the water so that waves have a limited or minimal effect on the vessel 1.

The vessel further includes a pile holding system 40 arranged on the upper deck 2. The pile holding system comprises a support structure 41 and a pile holder 42 supported by the support structure 41. The pile holder 42 includes gripping devices 43 to engage with a pile 50 to hold the pile 50 and limit horizontal motion of a pile portion held by the pile holder 42. The gripping devices 43 may be provided with a plurality of rollers to engage with the pile to hold the pile and to allow the pile to move in a direction parallel to the longitudinal axis of the pile relative to the pile holder while limiting the sideways motion of the pile portion held by the pile holder 42.

Piles like the pile 50 shown in FIG. 2 may be stored and/or transported on the vessel 1 or on a separate supply vessel in a horizontal orientation. Hence, in that situation, the crane 10 may be used to lift one end, i.e. an upper end of the pile 50, until the pile is suspended from the hoisting cable in a substantially vertical orientation as shown in FIG. 2. To this end, an attachment device 22 may be used as an interface between the pile 50 and the load connector 21, which attachment device 22 may be configured to allow rotation of the pile 50 relative to the load connector 21 without interfering with each other.

After providing the pile 50 in a vertical orientation, a lower portion or lower end of the pile 50 is provided in the pile holder 42 of the pile holding system 40. As such the position of the lower portion of the pile 50 is controlled by the pile holding system 40 and the position of the upper portion of the pile 50 is controlled using the hoisting cable 20 (for vertical positioning) and the two tugger lines 32, 33 (for horizontal positioning).

When the pile 50 is lowered using the hoisting cable 20, the pile 50 will first pass a splash zone of a body of water, which splash zone is the transition from air to water when lowering the pile into the water and where the pile is subjected to waves. The vessel 1, preferably the crane 10, includes a control system for controlling the hoisting winch and the two tugger winches 30, 31 to lower the pile 50 with the pile being held by the pile holding system 40 using the hoisting winch and to damp motion of the pile 50 in two respective horizontal directions using the two tugger winches 30, 31. Hence, when the rigid body eigenmode or a higher eigenmode is excited by waves and/or wind, the pile holding system and the tugger system are able to damp the resulting motion during lowering of the pile 50. This enables to install the pile adapted to support an offshore wind turbine in harsher wind and/or water conditions.

Alternatively, the tugger system could be replaced by a second pile holding system, but this would complicate the vessel dramatically as a relative large and heavy second pile holding system should be arranged above the other pile holding system 40. Further, a vertical distance between the two pile holding systems will always be a compromise between a small distance being preferred to allow both pile holding systems to hold the pile over as long a lowering height as possible, and a large distance being preferred to hold the pile properly in place during initial lowering when the lower portion of the pile is held by the lower pile holding system.

FIG. 3 schematically depicts the load connector 21 in plan view with the first tugger line 32 and the second tugger line 33 extending away from the load connector. The first tugger line 32 extends from the load connector 21 in a first tugger pull direction TP1 and the second tugger line 33 extends from the load connector 21 in a second tugger pull direction TP2. The first and second tugger pull directions TP1, TP2 define an interior bisector BI dividing an angle between the first and second tugger pull directions into two equal parts $\alpha$ and $\beta$. Preferably, during installation of a pile, the first and second tugger pull directions are positioned such that a wave propagation direction of the waves in the sea is in between a direction D1 perpendicular to the bisector BI and a direction D2 perpendicular to the first tugger pull direction TP1 as indicated using the solid shading or in between the direction D1 perpendicular to the bisector BI and a direction D3 perpendicular to the second tugger pull direction TP2 as indicated using the dotted/bubble shading. An advantage thereof may be that during the entire period of a pile eigenmode, in which the load connector is moving in a direction substantially parallel to the wave propagation direction, at least one of the two tugger lines 32, 33 is able to apply a pulling force to the pile which results in a more effective damping of the eigenmode.

Although the above examples describe the tugger system as being part of the crane, or arranged on the crane, the tugger system can also be provided elsewhere on the vessel, including but not limited to being arranged on the deck of the vessel, the pile holding system or a separate vessel. An example of the tugger system being provided on the deck of the vessel will now be described below in more detail.

FIGS. 4 and 5 depict a vessel 1 according to another embodiment of the invention. FIG. 4 only depicts a pile 50, a pile holding system 40, a tugger system, and a part of a crane 10. In FIG. 4, the pile 50 is in a substantially horizontal orientation. FIG. 5 depicts the pile 50, the pile holding system 40, a portion of the tugger system, and the crane 10 with the pile 50 in a substantially vertical orientation.

The vessel 1 is a jack-up type vessel in which legs 3 (partially visible in FIG. 4, but completely visible in FIG. 5) can be lowered into the water W to engage with a seabottom B via their corresponding feet 3*a* in order to lift the vessel 1 at least partially out of the water W so that waves have a limited or minimal effect on the vessel 1.

The pile holding system 40 is arranged on an upper deck 2 of the vessel 1. The pile holding system 40 comprises a support structure 41 and a pile holder 42 supported by the support structure 41. The pile holder 42 may include gripping devices to engage with the pile 50 to hold the pile and limit sideways motion of the pile portion held by the pile holder 42. Sideways motions are motions perpendicular to a longitudinal axis 51 of the pile 50.

The pile holding system 40 is configured such that the pile holder 42 is pivotable about a substantially horizontal pivot axis PA between a substantially vertical orientation of the pile holder 42 corresponding to a substantially horizontal orientation of the pile 50 held by the pile holder 42 as shown in FIG. 4, and a substantially horizontal orientation of the pile holder 42 corresponding to a substantially vertical orientation of the pile 50 held by the pile holder 42 as shown in FIG. 5. Piles 50 are typically transported in a substantially horizontal orientation due to their length. Having a pile holder 42 that is able to pivot as described above allows to introduce the piles 50 into the pile holder 42 while still being in the horizontal orientation thereby enabling the pile holder 42 to assist in guiding a lower end of the pile 50 during upending.

The pile holding system 40 further includes a bottom end support BES attached to the pile holder 42 so that the bottom end support BES is able to pivot along with the pile holder 42. The bottom end support BES is configured to engage with a bottom end of the pile 50 to hold the bottom end during upending.

Upending of the pile 50 is achieved by using a crane 10. The crane 10 may be of a similar type and design as the crane 10 of the embodiment in FIGS. 1 and 2. FIG. 4 depicts a portion of a hoisting system. The hoisting system includes a hoisting cable 20 and a load connector, e.g. a hook, 21 connected to the hoisting cable 20.

The crane 10 is used to lift one end, i.e. an upper end of the pile 50, until the pile is suspended from the hoisting cable 20 in a substantially vertical orientation as shown in FIG. 5. To this end, an attachment device 22 may be used as an interface between the pile 50 and the load connector 21, which attachment device 22 may be configured to allow rotation of the pile 50 relative to the load connector 21 without interfering with each other.

When the pile 50 is in the substantially vertical orientation and the entire weight of the pile 50 is carried by the crane 10, the bottom end support BES may be removed or moved out of the way to allow the pile 50 to be lowered into the water W.

The tugger system includes a tugger line 32 operable by a respective tugger winch 31. The tugger line 32 is shown in FIGS. 4 and 5, and the corresponding tugger winch 31 is shown in FIG. 4 only. The tugger winch 31 is arranged on the upper deck 2 of the vessel 1. The tugger system also includes a sheave 34 arranged on the upper deck 2 of the vessel 1 and a sheave 35 arranged on the attachment device 22. The tugger line 32 may extend, as shown in FIG. 4, from the tugger winch 31 to the sheave 35 via sheave 34 and then back to the upper deck 2, e.g. to be attached to or near the sheave 34. The tugger line 32 is then indirectly connected to the pile 50 at a location between the pile holding system 40 and the hoisting cable 20, namely to the attachment device 22.

In the shown embodiment, the tugger winch 31 and tugger line 32 are arranged below the pile 50 when the pile is in the substantially horizontal orientation. This means that the tugger system is aligned with the pile holding system 40 and the pile 50 in any orientation of the pile holder 42 and the pile 50.

When the pile 50 is lowered using the hoisting cable 20, the pile 50 will first pass a splash zone of the water W, which splash zone is the transition from air to water when lowering the pile 50 into the water W and where the pile 50 is subjected to waves. The vessel 1, possibly the crane 10, includes a control system for controlling a hoisting winch operating on the hoisting cable 20 and the tugger winch 31 to lower the pile 50 with the pile being held by the pile holding system 40 using the hoisting winch and to damp motion of the pile 50 in horizontal direction using the tugger winch 31. Hence, when the rigid body eigenmode or a higher eigenmode is excited by waves and/or wind, the pile holding system 40 and the tugger system are able to damp the resulting motion during lowering of the pile 50. This enables to install the pile adapted to support an offshore wind turbine in harsher wind and/or water conditions.

Although in the embodiment of FIGS. 4 and 5, the tugger system includes only one tugger line and corresponding tugger winch, the tugger system may be equipped with additional tugger lines and corresponding tugger winches as for instance shown in the embodiment of FIGS. 1 and 2 to enable dampening in at least two different horizontal directions. The tugger system as a whole may then be aligned with the pile holding system and the pile, but portions thereof, such as an individual pair of tugger line and tugger winch may not be aligned. Hence, a symmetrical layout of the tugger system about a plane extending through the longitudinal axis of the pile in the horizontal and vertical orientation may also be referred to as being an aligned tugger system.

Although the above examples indicate that the two tugger lines are connected to the load connector, any other location is also possible, including but not limited to the attachment device between the load connector and the upper end of the pile or the upper end of the pile itself.

Although the entire description indicates the use of two tugger lines, i.e. a first and a second tugger line, it is also envisaged that more than two, hence, three, four or more tugger lines are used. It is also possible that there are multiple sets of two tugger lines, each set being configured to act on a different portion of the pile or to act on the same portion of the pile but during different time periods. For instance, a first set of two tugger lines may operate on the pile (directly or indirectly) during a first lowering stage while a second set of two tugger lines may operate on the pile during a subsequent lowering stage. This may well be the case when the pile has a relatively large length and lowering may result in tugger lines getting a less preferred orientation with respect to the pile compared to other tugger lines, so that these tugger lines can take over the damping procedure.

The invention claimed is:

1. A vessel for installation of a pile adapted to support an offshore wind turbine, said vessel comprising:

a crane with a hoisting cable and hoisting winch to suspend the pile in a substantially vertical orientation and to lower the pile;

a pile holding system to hold the pile and limit horizontal motion of a pile portion held by the pile holding system;

a tugger system including two tugger lines and corresponding tugger winches, said tugger lines being directly or indirectly connectable to the pile at a location between the pile holding system and the hoisting cable; and a control system for controlling the hoisting winch and the two tugger winches to lower the pile with the pile being held by the pile holding system using the hoisting winch and to damp motion of the pile in two respective horizontal directions using the two tugger winches, wherein the pile holding system is configured to pivot between an orientation corresponding to a substantially horizontal orientation of a pile held in the pile holding system and an orientation corresponding to a substantially vertical orientation of a pile held in the pile holding system, and wherein the tugger system is substantially aligned with the pile holding system and the pile held in the pile holding system in any orientation of the pile holding system and the pipe held in the pile holding system.

2. The vessel according to claim 1, wherein the tugger system is arranged on the crane.

3. The vessel according to claim 1, wherein the tugger system is arranged on a structure of the vessel other than the crane.

4. The vessel according to claim 1, wherein the two tugger lines extend from the location between the pile holding system and the hoisting cable in a substantially horizontal direction.

5. The vessel according to claim 1, wherein the location between the pile holding system and the hoisting cable is on an upper end of the pile.

6. The vessel according to claim 1, wherein the location between the pile holding system and the hoisting cable is at a load connector suspended by the hoisting cable, or at an attachment device between the load connector and the upper end of the pile.

7. The vessel according to claim 1, wherein the two tugger lines include a first tugger line and a second tugger line, and wherein the corresponding tugger winches include a first tugger winch for the first tugger line and a second tugger winch for the second tugger line.

8. A vessel for installation of a pile adapted to support an offshore wind turbine, said vessel comprising:

a crane with a hoisting cable and hoisting winch to suspend the pile in a substantially vertical orientation and to lower the pile;

a pile holding system to hold the pile and limit horizontal motion of a pile portion held by the pile holding system;

a tugger system including two tugger lines and corresponding tugger winches, said tugger lines being directly or indirectly connectable to the pile at a location between the pile holding system and the hoisting cable; and a control system for controlling the hoisting winch and the two tugger winches to lower the pile with the pile being held by the pile holding system using the hoisting winch and to damp motion of the pile in two respective horizontal directions using the two tugger winches, wherein the two tugger lines include a first tugger line and a second tugger line, and wherein the corresponding tugger winches include a first tugger winch for the first tugger line and a second tugger winch for the second tugger line, and wherein the tugger system includes a first tugger sheave to guide the first tugger line between the first tugger winch and the location between the pile holding system and the hoisting cable, and a second sheave to guide the second tugger line between the second tugger winch and the location between the pile holding system and the hoisting cable.

9. The vessel according to claim 8, wherein the crane comprises a boom rotatably connected to a structure to rotate about a substantially horizontal rotation axis, and wherein the structure comprises a spreader to guide the two tugger lines at opposite sides of the boom towards the location between the pile holding system and the hoisting cable.

10. The vessel according to claim 8, wherein the first and second sheave are arranged on a spreader.

11. The vessel according to claim 10, wherein a respective sheave guides each tugger line towards the location between the pile holding system and the hoisting cable, or wherein the tugger system is arranged at an elevated position above the upper deck of the vessel.

12. The vessel according to claim 9, wherein the first and second sheave are arranged on a spreader.

13. A vessel according to claim 8, wherein the first and second tugger winches are arranged on the crane.

* * * * *